United States Patent [19]

Fisch

[11] 3,955,701

[45] May 11, 1976

[54] UNIVERSAL EXTENSION FOR OUTLET BOXES

[76] Inventor: Reinhold Fisch, 29 Elenor Place, Yonkers, N.Y. 10705

[22] Filed: Apr. 21, 1975

[21] Appl. No.: 569,906

[52] U.S. Cl. .................................. 220/3.7; 174/57
[51] Int. Cl.² ..................... H02B 1/10; H02G 3/14
[58] Field of Search ............ 220/3.2, 3.3, 3.4, 3.5, 220/3.6, 3.7, 3.8, 3.9, 3.92, 3.94, 4 A, 4 C, 241, 242; 174/53, 57

[56] References Cited
UNITED STATES PATENTS

| | | | |
|---|---|---|---|
| 1,952,719 | 3/1934 | Lewin | 220/241 X |
| 1,991,160 | 2/1935 | Knight | 220/3.7 |
| 2,378,861 | 6/1945 | Peevey | 220/3.7 X |
| 2,622,756 | 12/1952 | Appleton | 220/3.94 |
| 2,989,206 | 6/1961 | McAfee | 220/3.7 |
| 3,288,910 | 11/1966 | Zerwes | 174/53 |

*Primary Examiner*—William Price
*Assistant Examiner*—Stephen Marcus

[57] ABSTRACT

A universal extension ring for electrical outlet boxes is described. It is adapted to be mounted on the ordinary single or two-device outlet box to increase its volume and also to enable single or double switches or receptacles to be secured thereto. The extension ring features removable back panels to accomplish the above objectives.

6 Claims, 4 Drawing Figures

UNIVERSAL EXTENSION FOR OUTLET BOXES

This invention relates to an extension ring for electrical outlet boxes.

Ordinary electrical outlet boxes are mounted within or without walls, ceiling and floors of constructions for receiving through holes in the box walls the usual electrical cables or conduits for interconnection within the box or for connection to the usual electrical devices, such as switches, electrical receptacles, lamp receptacles and the like, secured over the box face. The boxes come square (typically 4 inches wide) or rectangular (typically 1½ – 2 inches wide). The narrower box can accommodate one device, and the wider box one or two devices. Two of the narrow boxes can be ganged (placed side-by-side) to accommodate two devices. The typical narrow box has threaded holes located at the center of the narrow sides for securing a cover plate to the box or a single electrical device directly. The wider box is usually provided with threaded holes located at diagonally opposite upper corners of the box for securing a cover plate to the box. Suitable cover plates with corner slots are available for mounting on the wider box. When intended for accommodating a single device, the cover plate has a set of threaded holes located at the center. When the cover plate is intended for accommodating two electrical devices side-by-side, then two sets of threaded holes are located in the cover plate.

Often the user desires to increase the volume of usable space within a box to accommodate more connections or larger wires, or to locate such boxes in a wall recess for wiring convenience. This can be accomplished as taught in the prior art by means of an extension ring which is fitted between the box and its cover plate or attached electrical device. The known extension ring for the wider box comprises a similar rectangular configuration open at its front and rear faces and provided with slots at its lower corners for receiving screws to the corner threaded holes on the box for attachment of the extension ring to the box. Such extension ring is provided with threaded holes at its upper corners for attachment of the cover plate. Should the user desire to extend the narrow box, then he must choose a different extension ring configured to match the narrow box with threaded holes located at the center of the side walls for attachment of the single device. To extend ganged narrow boxes requires the attachment of a separate narrow extension ring to each of the boxes. It will be recognized that those persons who regularly use extension rings for the purposes specified above thus require to have in stock or readily available both types of known extension rings. Moreover, there is no known way of extending a single narrow box to accommodate two electrical devices.

The main object of the invention is a single extension ring that is adapted for attachment to the wider outlet box, to a single narrow outlet box, or to dual ganged narrow outlet boxes and which is constructed for mounting of a cover plate for accommodating one or two electrical devices, and thus can be substituted and used in place of the plural known extension rings.

This and other objects and advantages of the invention as will appear hereinafter are achieved in accordance with the invention by a novel construction of extension ring characterized by a box-like structure which has a shape and dimensions similar to that of the wider box and comprising side walls with the usual knock-out plugs for receiving electrical cable, diagonally opposed corner tabs with threaded holes at its upper face and defining an open upper face, and opposed spaced panels at the lower face and extending in from opposed first side walls which together with opposed lips having three holes extending in from opposed side walls defining a partially open lower face having a generally rectangular configuration. Each of the lower panels are scored close to their respective side wall to enable ready break-out of the panels by the user. Each of the lips at the lower face terminate in a diagonal slot which is diametrially located with respect to the opposite corner slot. The threaded holes in the corner tabs at the upper face are adapted for mounting of the usual cover plate for accommodating one or two electrical devices.

The invention will now be described in greater detail with reference to the accompanying drawing, wherein.

Figure 1A:
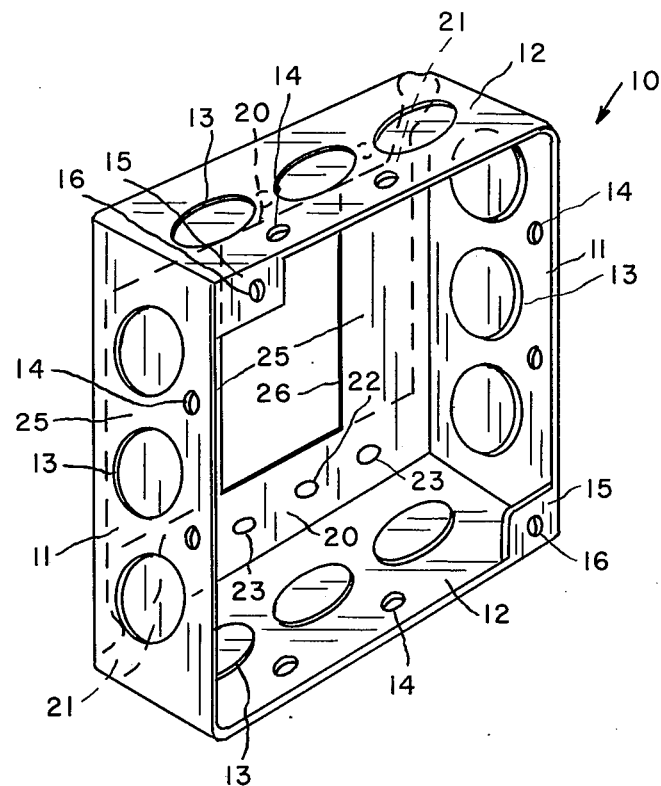
FIG. 1a is a perspective view of one form of extension ring in accordance with the invention.

FIG. 1 shows one form of extension ring 10 in accordance with the invention. It comprises a generally square-configured box having left and right side walls 11 and top and bottom side walls 12. The side walls are conveniently provided with the usual knock-out plugs 13 by which electrical cables or conduits (not shown) can be brought into the extension ring 10, and various holes 14 useful for mounting of the extension ring 10 to a supporting beam if desired. The front or room-side face of the extension ring is open except for diagonally-located corner tabs 15 each having a threaded hole 16 for receiving a mounting screw for mounting of a known cover plate. The front face is similar to that of the known extension ring for the wide box.

Figure 1B:
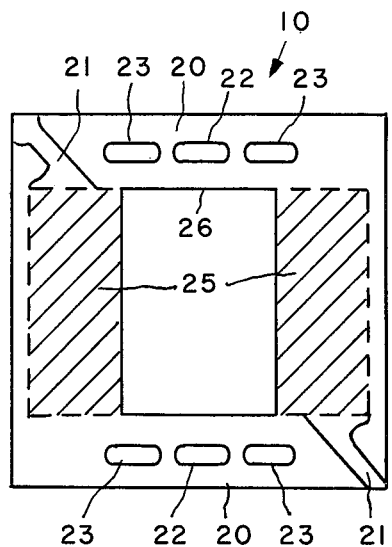
FIG. 1b is a plan view of the bottom of the extension ring of FIG. 1a with the removable panels shown hatched.

The bottom face of the extension ring, shown in plan view in FIG. 1b, comprise opposed lips 20 extending in from the side walls 12. The lips terminate, at diagonally-opposite corners, in slots 21 with widened ends for receiving screws when the extension ring 10 is to be attached to the wider box. Each of the lips 20 are also provided with three slotted holes aligned in a row. The center holes 22 are used when the extension ring 10 is to be attached to a single narrow box by suitable screws. The outer holes 23 are used when the extension ring is to be attached to ganged narrow boxes by suitable screws. The bottom face also comprises spaced panels 25 extending in from the side walls 11. The panels are scored or partially cut through where attached near the side walls 11 and to the lips 20 (shown by dashed lines in FIG. 1b), where by they are readily broken-out and removed when desired by the user. The panels sections 25 which can be removed are shown hatched in FIG. 1b. The removable panels 25 and lips 20 define a generally rectangular opening 26 in the bottom which generally conforms to the open face of the known narrow box. For a ring 10 which is typically 4 inches square, the opening 26 would be about 2 inches wide.

Figure 2:
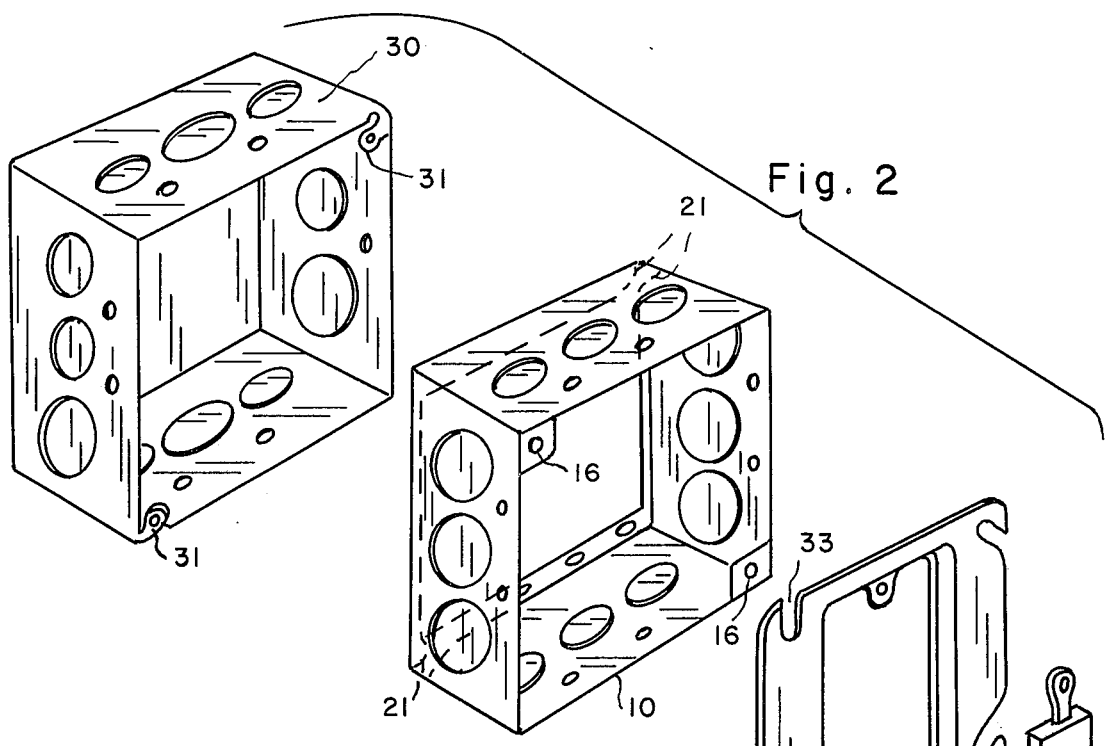
FIG. 2 is an exploded perspective view of a known wide outlet box together with the extension ring of FIG. 1a with the back panels removed with a known cover plate for accommodating a single switch.
Figure 3:
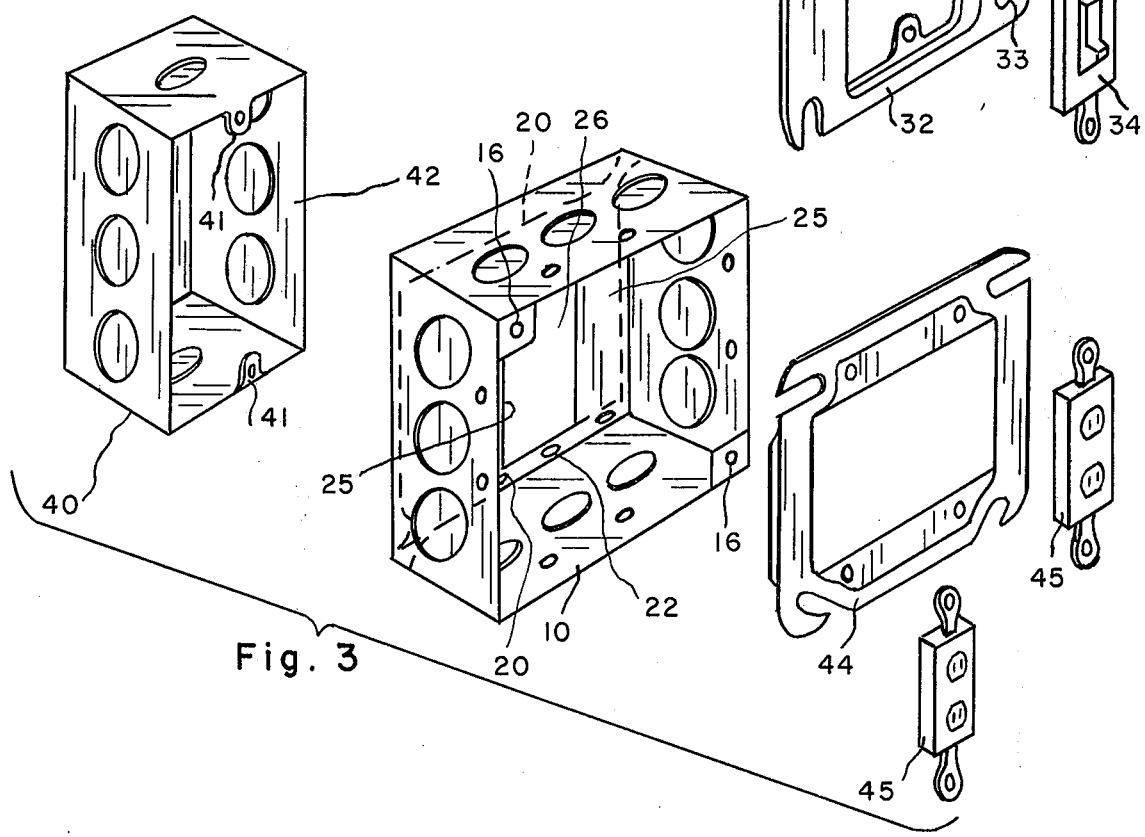
FIG. 3 is a view similar to FIG. 2 but with a known narrow box which is extended for a known cover plate to accommodate two receptacles.

The manner in which the extension ring of the invention can be used is depicted in FIGS. 2 and 3. FIG. 2 shown a known installed wide outlet box 30. Suppose the user desires to extend the outlet box to provide more interior space for more connections and also to provide a single switch. For this situation, the extension ring 10 of the invention has its rear panels 25 broken-out (shown removed in FIG. 2). The extension ring 10 is mounted on the box 30 by means of screws (not shown) which pass through the corner slots 21 and are threaded into the usual threaded hole corner tabs 31 at the front face of the box 30. Then a usual cover plate 32 may be provided and mounted on the corner threaded holes 16 on the front face of the extension ring 10 by the usual screws (not shown) extending through slots 33 in the cover plate. The single switch, shown at 34, can then be mounted in the usual way on the cover plate 32. By substituting a duplex cover plate, two electrical devices can be mounted on the extension ring 10.

FIG. 3 depicts the situation wherein the installed outlet box 40 is of the narrow type. Suppose the user desires to extend same to provide more interior space for interconnections, or just to provide accommodations for two electrical devices, or for both purposes. The extension ring 10 of the invention is then used with the back panels 25 in place. For this situation, the center set of holes 22 is employed for mounting of the extension ring 10 onto the usual threaded hole center tabs 41 of the box 40 by means of the usual screws (not shown). As will be observed, the opening 26 between the panels 25 and lips 20 is configured to be approximately the same size as the front face opening 42 on the box 40. Then, a known duplex cover plate 44 is provided which can be attached to the extension ring 10 by means of screws in the same manner as in FIG. 2, and the two receptacles 45 then mounted on the duplex cover plate 44.

When two ganged narrow boxes are to be extended, then the scored panels 25 are removed, and the extension ring 10 is attached to the ganged boxes by means of the two sets of outer holes 23, which are located to be aligned over the tabs 41 of the ganged boxes. Then a single or duplex cover plate can be attached to the extension ring to accommodate one or two electrical devices as desired. It will also be understood that a blank cover plate can also be substituted where desired.

It will be clear from the foregoing description that the novel extension ring of the invention is useful for extending wide boxes, single narrow boxes, or ganged narrow boxes to provide more space for interconnections or to receive cover plates for accommodating one or two electrical devices or none as desired.

What is claimed is:

1. An extension ring for extending electrical outlet boxes, comprising a generally rectangular-configured box having first and second opposed side walls and an open front face and a rear face, plural knockout plugs in its side walls, plural inwardly directed tabs having threaded openings located at the box front face at diagonally-located corners for mounting of a cover plate, lips extending inward from first opposed side walls in the plane of the rear face and having plural unthreaded openings, and spaced removable panels extending inward from second opposed side walls in the plane of the rear face, said box having openings at its corners at its rear face, said lips and panels defining a generally rectangular opening at the center of the rear face, said rear corner openings comprising angularly directed slots at diagonal corners where the panels and lips meet for mounting of the ring on the outlet box.

2. An extension ring as claimed in claim 1 wherein each lip has three spaced slotted openings aligned in a row in each lip and with the openings in the other lip.

3. An extension ring as claimed in claim 2 wherein the ring is about 4 inches square with the center opening in the rear face approximately 2 inches wide.

4. An extension ring as claimed in claim 1 wherein the panels have scorings where they can be broken out.

5. An extension ring as claimed in claim 1 wherein the corner tabs are located at diagonal corners different from the corners where the slots are located.

6. An extension ring as claimed in claim 1 wherein the depth of the extension ring is approximately the same as that of the outlet box.

* * * * *